Patented June 24, 1930

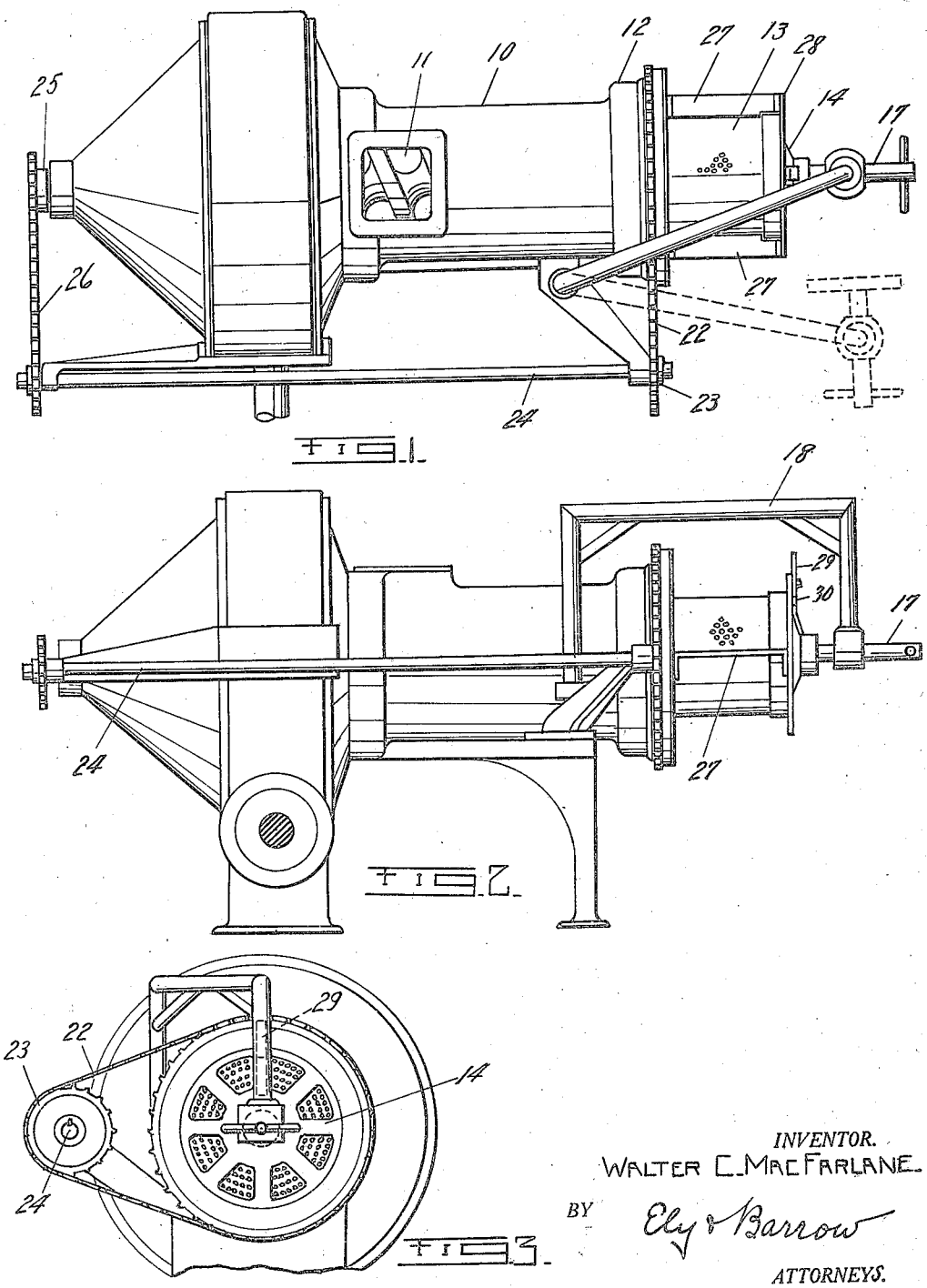

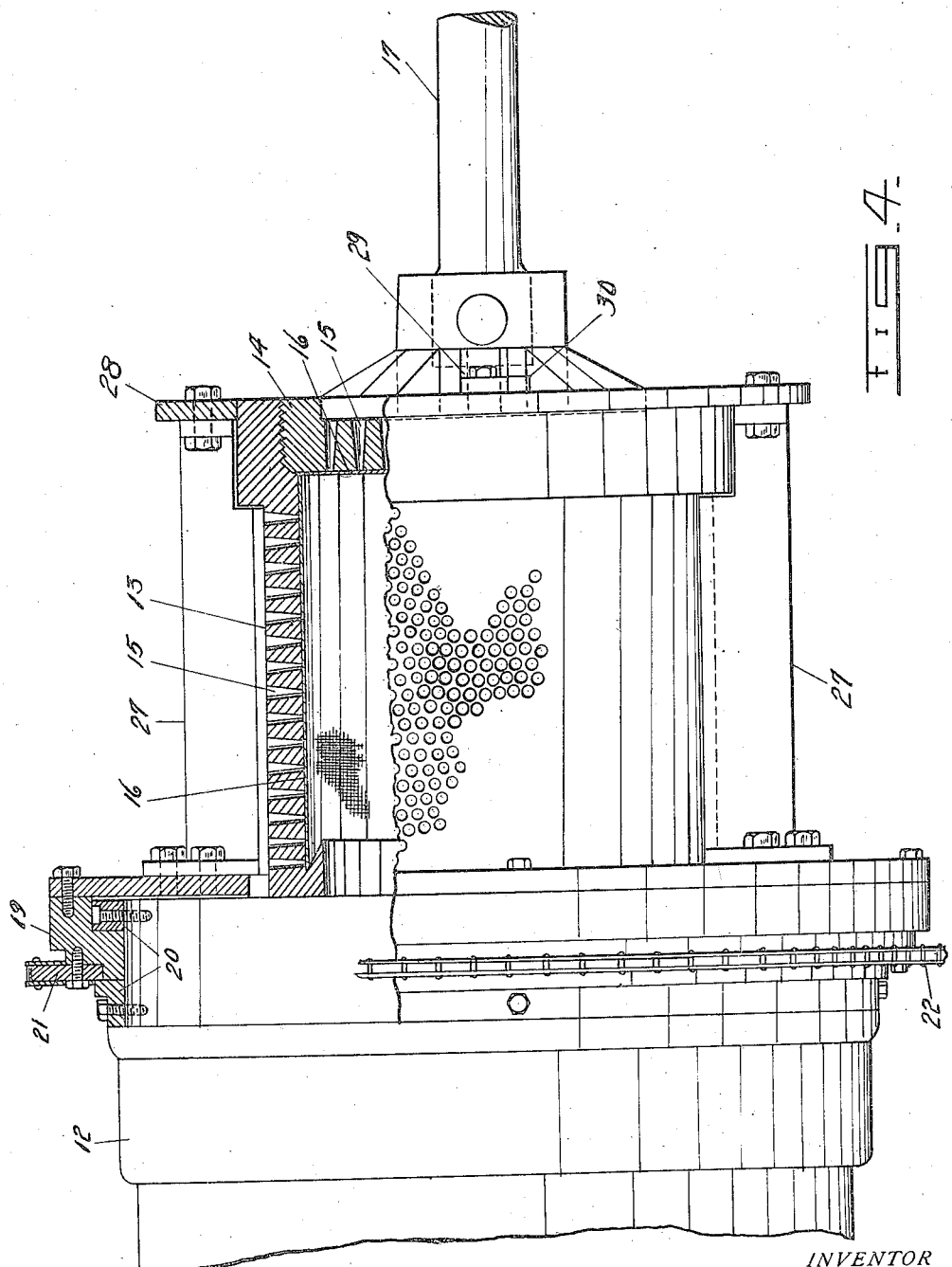

1,768,365

UNITED STATES PATENT OFFICE

WALTER C. MACFARLANE, OF KENMORE, OHIO, ASSIGNOR TO THE XYLOS RUBBER COMPANY, OF AKRON, OHIO, A CORPORATION OF OHIO

CUT-OFF DEVICE FOR EXTRUDING MACHINES

Application filed December 15, 1927. Serial No. 240,201.

This invention relates to extruding machines and particularly to devices for cutting off in desired lengths the material expressed from such machines.

An object of the invention is to devise means for cutting off the materials forced from die expressing or extruding machines, to eliminate hand operations and extra handling and to promote safety and sanitation in the operation of said machines. A further object is to provide a set of rotatable knives movable across the extrusion orifices of such a machine. Another object of the invention is to provide cutting means both for the lateral cylindrical surfaces and for the plane or conical end surfaces of an extrusion head. A further object is to provide means for supporting the head or end plug or die while replacing or removing dies or strainers from said heads.

The foregoing and other objects are obtained by the device illustrated in the drawings and described below. It is to be understood that the device is not limited to the specific form thereof disclosed herein.

Of the accompanying drawings,

Figure 1 is a plan view of an extruding machine having attached thereto devices embodying the principles of the invention;

Figure 2 is a side elevation thereof;

Figure 3 is an end elevation thereof; and

Figure 4 is an enlarged detail view partly in section of the extruding head and the parts attached thereto.

Referring to the drawings, 10 represents the cylinder of an extruding machine, the particular type shown being used in the rubber industry for straining out foreign matter in the refining of rubber. Rubber stock fed into hopper 11 is forced through head 12 and out of a strainer comprising a cylindrical portion 13 and a removable end plug 14 screw-threaded into the cylindrical portion. The strainer is perforated to provide apertures 15 in its side and end faces and the interior is lined with screens 16. A stud shaft 17 is fixed to the plug 14 and journaled in the end of a pivoted bracket 18 whereby the plug may be conveniently supported and swung out of the way to the dotted line position in Figure 1 while screens 16 are being changed or cleaned. This supporting means for the plug also assists in aligning the same for replacement after the cleaning operation.

The cut-off mechanism comprises a rotatable collar 19 retained on head 12 by a pair of rings 20 attached thereto. The collar is rotated by a sprocket 21 fixed thereon and driven by a chain 22 trained thereover and over sprocket 23 keyed to countershaft 24, the latter being in turn driven from the extruder screw shaft 25 by means of a chain and sprocket connection 26. Attached to collar 19 are a pair of knives 27 extending axially along the cylindrical portion 13 of the strainer and lying close thereto, their outer ends being connected by a collar 28 journaled about the end of the strainer. An end knife 29 is pivoted to collar 28 and extends radially inwardly along the end plug 14. Knife 29 may be swung out of the way when plug 14 is being removed and is prevented from swinging in the opposite direction by a lug 30 formed on collar 28.

The cutter knives, in operation, shear off the material that is forced through the screen, strainer, dies or other apertures at the extrusion end of the machine and the material thus cut off may be permitted to drop onto a belt or other conveyor (not shown) to be carried to a subsequent operation. The device illustrated is adapted to be driven by the rotation of the feed screw drive, but it will be understood that the knives may be rotated by hand or by an independent, continuous or intermittent power drive. The advantages gained are the saving of labor and the promotion of safety and sanitation.

Modifications of the structure herein disclosed may be resorted to without departing from the spirit of the invention or the scope thereof as defined by the appended claims.

What is claimed is:

1. The combination with an extruding machine comprising a head having a cylindrical face and a plane end face, each formed with extrusion apertures, of a rotatable collar journaled about said head, a plurality of cutting knives carried by said collar and extending axially along said cylindrical face, a knife connected to the first mentioned knives and extending radially inwardly along said end face, and driving means connecting the collar with the main drive of the machine for rotating the knives past said apertures to cut off material expressed therefrom.

2. The combination with an extruding machine comprising cylindrical extrusion head provided with lateral and end apertures, of a knife mounted to travel about said head in proximity to the lateral and end apertures therein, and means for rotating the knife about the head to sever therefrom the material extruded through said apertures.

3. The combination with an extruding machine comprising a cylindrical extrusion head having formed therein a plurality of extrusion orifices through which material is to be expressed, and an apertured plate forming the end of said extrusion head, of a cutting tool mounted for rotation about said head to travel past said orifices, a knife connected to said tool to travel past the apertures in said plate, and means for rotating said cutting tool and said knife to sever said material as the latter is extruded through said head and said plate.

4. The combination with an extruding machine comprising a cylindrical extrusion head having formed therein a plurality of extrusion orifices through which material is to be expressed, and an apertured plate forming the end of said extrusion head, of a cutting tool mounted for rotation about said head to travel past said orifices, a pivoted knife connected to said tool to travel past the apertures in said plate, and means for rotating said cutting tool and said knife to sever said material as the latter is extruded through said head and said plate, said knife being adapted to be swung out of the way when the plate is to be removed.

WALTER C. MacFARLANE.